United States Patent
Moseley

(10) Patent No.: US 8,601,828 B2
(45) Date of Patent: Dec. 10, 2013

(54) CAPACITY CONTROL SYSTEMS AND METHODS FOR A COMPRESSOR

(75) Inventor: Joel Moseley, Bristol, TN (US)

(73) Assignee: Bristol Compressors International, Inc., Bristol, VA (US)

( * ) Notice: Subject to any disclaimer, the term of this patent is extended or adjusted under 35 U.S.C. 154(b) by 840 days.

(21) Appl. No.: 12/769,819

(22) Filed: Apr. 29, 2010

(65) Prior Publication Data

US 2010/0275628 A1    Nov. 4, 2010

Related U.S. Application Data

(60) Provisional application No. 61/173,833, filed on Apr. 29, 2009.

(51) Int. Cl.
*F25B 49/00* (2006.01)

(52) U.S. Cl.
USPC ................................................ 62/229

(58) Field of Classification Search
USPC .................. 62/228, 228.4, 228.5, 229
See application file for complete search history.

(56) References Cited

U.S. PATENT DOCUMENTS

| | | | |
|---|---|---|---|
| 2,219,199 A | 10/1940 | Renner | |
| 2,390,650 A | 12/1945 | Hollatz et al. | |
| 3,261,172 A | 7/1966 | Grant | |
| 3,388,559 A | 6/1968 | Johnson | |
| 3,411,313 A | 11/1968 | Brown et al. | |
| 3,874,187 A | 4/1975 | Anderson | |
| 3,903,710 A | 9/1975 | Quatman | |
| 4,047,242 A | 9/1977 | Jakob et al. | |
| 4,475,358 A | 10/1984 | Seifert et al. | |
| 4,487,028 A | 12/1984 | Foye | |
| 4,577,471 A | 3/1986 | Meckler | |
| 4,616,693 A | 10/1986 | Dietzsch et al. | |
| 4,709,560 A | 12/1987 | Voorhis et al. | |
| 4,720,981 A | 1/1988 | Helt et al. | |
| 4,891,953 A | 1/1990 | Isono | |
| 4,895,005 A | 1/1990 | Norbeck et al. | |
| 4,951,475 A | 8/1990 | Alsenz | |
| 4,965,658 A | 10/1990 | Norbeck et al. | |
| 5,012,656 A | 5/1991 | Tamura | |
| 5,025,638 A | 6/1991 | Yamagishi et al. | |
| 5,044,167 A | 9/1991 | Champagne | |
| 5,052,186 A | 10/1991 | Dudley et al. | |
| 5,062,276 A | 11/1991 | Dudley | |
| 5,062,277 A | 11/1991 | Heitmann et al. | |
| 5,066,197 A | 11/1991 | Champagne | |
| 5,081,846 A | 1/1992 | Dudley et al. | |
| 5,088,297 A | 2/1992 | Maruyama et al. | |

(Continued)

FOREIGN PATENT DOCUMENTS

| CN | 2401835 U | 10/2000 |
|---|---|---|
| DE | 4338939 C1 | 2/1995 |

(Continued)

*Primary Examiner* — Marc Norman
(74) *Attorney, Agent, or Firm* — McNees Wallace & Nurick LLC

(57) ABSTRACT

A system and method are provided to control the output capacity of a compressor in response to the outdoor ambient temperature. The outdoor ambient temperature is measured by a sensor. The measured outdoor ambient temperature is then used to control the output capacity of the compressor. The compressor is operated at less than 100% capacity in response to the outdoor ambient temperature being less than or equal to 95° F. If the outdoor ambient temperature reaches a predetermined temperature greater than 95° F., the compressor is then operated at 100% capacity.

20 Claims, 6 Drawing Sheets

(56) References Cited

U.S. PATENT DOCUMENTS

| | | | |
|---|---|---|---|
| 5,144,812 | A | 9/1992 | Mills, Jr. et al. |
| 5,177,972 | A | 1/1993 | Sillato et al. |
| 5,182,915 | A | 2/1993 | Iida et al. |
| 5,220,809 | A | 6/1993 | Voss |
| 5,263,335 | A | 11/1993 | Isono et al. |
| 5,285,646 | A | 2/1994 | TaeDuk |
| 5,303,561 | A | 4/1994 | Bahel et al. |
| 5,315,376 | A | 5/1994 | Wada et al. |
| 5,323,619 | A | 6/1994 | Kim |
| 5,350,039 | A | 9/1994 | Voss et al. |
| 5,475,985 | A | 12/1995 | Heinrichs et al. |
| 5,533,352 | A | 7/1996 | Bahel et al. |
| 5,546,073 | A | 8/1996 | Duff et al. |
| 5,553,997 | A | 9/1996 | Goshaw et al. |
| 5,568,732 | A | 10/1996 | Isshiki et al. |
| 5,651,260 | A | 7/1997 | Goto et al. |
| 5,671,607 | A | 9/1997 | Clemens et al. |
| 5,729,995 | A | 3/1998 | Tajima |
| 5,752,385 | A | 5/1998 | Nelson |
| 5,765,994 | A | 6/1998 | Barbier |
| 5,826,643 | A | 10/1998 | Galyon et al. |
| 6,034,872 | A | 3/2000 | Chrysler et al. |
| 6,041,609 | A | 3/2000 | Hornsleth et al. |
| 6,070,110 | A | 5/2000 | Shah et al. |
| 6,116,040 | A | 9/2000 | Stark |
| 6,172,476 | B1 | 1/2001 | Tolbert, Jr. et al. |
| 6,237,420 | B1 | 5/2001 | Rowlette et al. |
| 6,330,153 | B1 | 12/2001 | Ketonen et al. |
| 6,353,303 | B1 | 3/2002 | Ramachandran et al. |
| 6,363,732 | B1 | 4/2002 | Bluhm |
| 6,375,563 | B1 | 4/2002 | Colter |
| 6,384,563 | B1 | 5/2002 | Someya |
| 6,434,003 | B1 | 8/2002 | Roy et al. |
| 6,434,960 | B1 | 8/2002 | Rousseau |
| 6,511,295 | B2 | 1/2003 | Suitou et al. |
| 6,523,361 | B2 | 2/2003 | Higashiyama |
| 6,524,082 | B2 | 2/2003 | Morita et al. |
| 6,560,980 | B2 | 5/2003 | Gustafson et al. |
| 6,560,984 | B2 | 5/2003 | Bellet |
| 6,604,372 | B2 | 8/2003 | Baumert et al. |
| 6,639,798 | B1 | 10/2003 | Jeter et al. |
| 6,663,358 | B2 | 12/2003 | Loprete et al. |
| 6,675,590 | B2 | 1/2004 | Aarestrup |
| 6,688,124 | B1 | 2/2004 | Stark et al. |
| 6,704,202 | B1 | 3/2004 | Hamaoka et al. |
| 6,808,372 | B2 | 10/2004 | Makino et al. |
| 6,817,198 | B2 | 11/2004 | Wilson et al. |
| 6,826,923 | B2 | 12/2004 | Nakano et al. |
| 6,829,904 | B2 | 12/2004 | Roh et al. |
| 6,874,329 | B2 | 4/2005 | Stark et al. |
| 6,886,354 | B2 | 5/2005 | Dudley |
| 7,164,242 | B2 | 1/2007 | Federman et al. |
| 7,628,028 | B2 | 12/2009 | Tolbert, Jr. et al. |
| 7,878,006 | B2 | 2/2011 | Pham |
| 2001/0000880 | A1 | 5/2001 | Chu et al. |
| 2001/0017039 | A1 | 8/2001 | Weimer |
| 2002/0043074 | A1 | 4/2002 | Ott et al. |
| 2002/0108384 | A1 | 8/2002 | Higashiyama |
| 2003/0089121 | A1 | 5/2003 | Wilson et al. |
| 2003/0205052 | A1 | 11/2003 | Kim et al. |
| 2004/0055322 | A1 | 3/2004 | Monfarad |
| 2004/0065095 | A1 | 4/2004 | Osborne et al. |
| 2004/0139112 | A1 | 7/2004 | Wickham et al. |
| 2004/0163403 | A1 | 8/2004 | Monfarad |
| 2004/0194485 | A1 | 10/2004 | Dudley |
| 2004/0237551 | A1 | 12/2004 | Schwarz et al. |
| 2004/0237554 | A1 | 12/2004 | Stark et al. |
| 2004/0261441 | A1 | 12/2004 | Turner et al. |
| 2005/0076665 | A1 | 4/2005 | Pruitt |
| 2005/0086959 | A1 | 4/2005 | Wilson et al. |
| 2005/0247073 | A1 | 11/2005 | Hikawa et al. |
| 2006/0010891 | A1 | 1/2006 | Rayburn |
| 2007/0022765 | A1 | 2/2007 | Lifson et al. |
| 2007/0095081 | A1 | 5/2007 | Ootori et al. |
| 2007/0256432 | A1 | 11/2007 | Zugibe et al. |
| 2009/0090118 | A1 | 4/2009 | Pham et al. |
| 2009/0266091 | A1 | 10/2009 | Tolbert, Jr. |
| 2009/0324426 | A1 | 12/2009 | Moody et al. |
| 2009/0324427 | A1 | 12/2009 | Tolbert, Jr. et al. |
| 2009/0324428 | A1 | 12/2009 | Tolbert, Jr. et al. |

FOREIGN PATENT DOCUMENTS

| | | | |
|---|---|---|---|
| EP | 0196863 | A1 | 10/1986 |
| EP | 0376498 | A1 | 7/1990 |
| EP | 0933603 | A1 | 8/1999 |
| EP | 1260774 | A2 | 11/2002 |
| EP | 1164035 | B1 | 8/2004 |
| JP | 58127038 | A | 7/1983 |
| JP | 62029853 | A | 2/1987 |
| JP | 1296038 | A | 11/1989 |
| JP | 4338670 | A | 11/1992 |
| JP | 6213498 | A | 8/1994 |
| JP | 814709 | A | 1/1996 |
| JP | 8145405 | A | 6/1996 |
| JP | 2000111216 | A | 4/2000 |
| JP | 2001163038 | A | 6/2001 |
| JP | 2003214659 | A | 7/2003 |
| JP | 2004219031 | A | 8/2004 |
| JP | 2004325023 | A | 11/2004 |
| WO | 9411212 | A1 | 5/1994 |
| WO | 9815790 | A1 | 4/1998 |
| WO | 0022358 | A1 | 4/2000 |
| WO | 0078111 | A1 | 12/2000 |

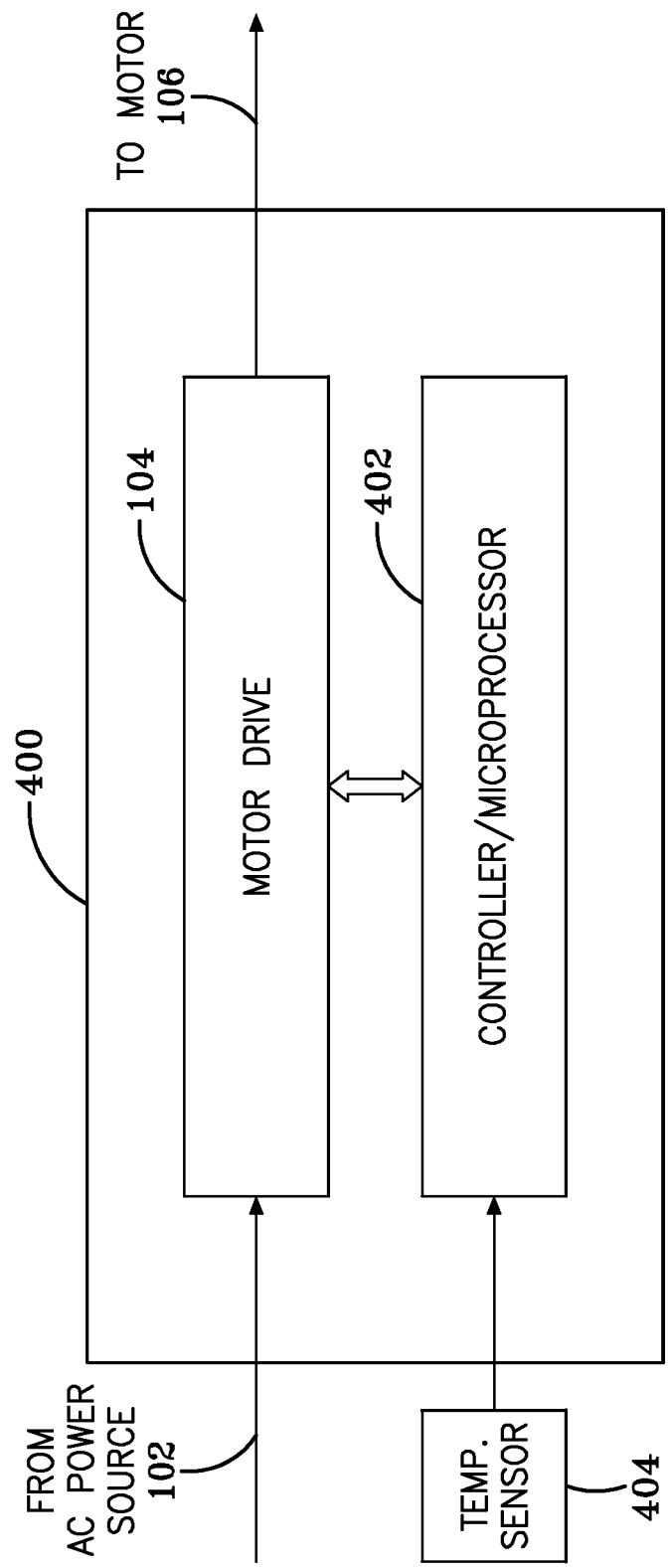

CAPACITY CONTROL SYSTEMS AND METHODS FOR A COMPRESSOR

CROSS-REFERENCE TO RELATED APPLICATIONS

This application claims priority from and the benefit of U.S. Provisional Application No. 61/173,833, entitled CONTROL SYSTEMS AND METHODS FOR VARIABLE SPEED COMPRESSOR SYSTEMS, filed Apr. 29, 2009, which is hereby incorporated by reference.

BACKGROUND

The application generally relates to a control system for a compressor. More specifically, the application is directed to controlling the output capacity of a compressor based on the outdoor ambient temperature.

Many traditional heating, ventilation and air conditioning (HVAC) systems can operate with a single speed compressor and deliver 100% of the compressor's possible output capacity at all times regardless of the amount of cooling required for the system (cooling load). HVAC systems can be rated for system capacity and Energy Efficiency Ratio (EER) at a 95° F. outdoor ambient temperature condition as required by industry standards and government regulations. HVAC systems can also be rated for Seasonal Energy Efficiency Ratio (SEER) at an 82° F. outdoor ambient temperature condition. Some HVAC systems may modulate the output capacity of the compressor to reduce the compressor capacity at the 82° F. outdoor ambient temperature condition or point to more effectively match or correspond the output capacity of the compressor to the cooling requirement of the HVAC system and thereby improve the SEER rating. However, an HVAC system that modulates capacity at the 82° F. outdoor ambient temperature point may still rate the system capacity and EER at 100% of the available compressor output or capacity at the 95° F. outdoor ambient temperature point.

As discussed above, HVAC systems are rated for capacity and efficiency at a 95° F. outdoor ambient temperature condition. However, HVAC systems are also required to provide cooling at outdoor ambient temperature conditions of 115° F. or higher. Since the output capacity of the compressor is greater at 95° F. than at 115° F., and the compressor capacity is rated at 100% output, the capacity output of the compressor at the 95° F. temperature condition can exceed the load requirement for the HVAC system, which results in less efficient operation of the HVAC system.

Therefore, what is needed is control systems and methods for a compressor to permit the compressor to operate efficiently at the 95° F. outdoor ambient temperature point while still having sufficient available capacity to satisfy load requirements for the HVAC system at higher outdoor ambient temperatures, i.e., greater than 95° F.

SUMMARY

The present invention is directed to a method of controlling output capacity for a compressor in a heating, ventilation and air conditioning (HVAC) system. The method includes measuring an outdoor ambient temperature and operating the compressor to generate a predetermined output capacity in response to the outdoor ambient temperature being less than or equal to 95° F. The predetermined output capacity is less than 100% output capacity from the compressor. The method also includes increasing the output capacity of the compressor to 100% output capacity in response to the outdoor ambient temperature being greater than a predetermined temperature. The predetermined temperature is greater than 95° F. The method further includes operating the compressor at 100% output capacity in response to the outdoor ambient temperature being greater than the predetermined temperature.

The present invention is further directed to a system including a compressor, a condenser and an evaporator connected in a closed refrigerant loop and a motor connected to the compressor to power the compressor. The motor is configured to operate at a plurality of output speeds to generate a plurality of output capacities from the compressor. The system also includes a motor drive connected to the motor to power the motor and a control system to control operation of the motor drive. The motor drive is configured to provide the motor with a plurality of output frequencies and corresponding voltages to generate the plurality of output speeds from the motor. The system further includes a sensor to measure a parameter corresponding to an outdoor ambient temperature and to provide a signal to the control system with the measured parameter. The control system is configured to operate the motor drive to generate a predetermined output capacity from the compressor in response to the outdoor ambient temperature being less than or equal to 95° F. The predetermined output capacity is less than 100% output capacity from the compressor. The control system is configured to operate the motor drive to generate 100% output capacity from the compressor in response to the outdoor ambient temperature being greater than a predetermined temperature. The predetermined temperature is greater than 95° F.

The present invention is also directed to a control system for a compressor motor including a motor drive connectable to the compressor motor to power the compressor motor and a controller to control operation of the motor drive. The motor drive is configured to provide the compressor motor with a plurality of output frequencies and corresponding voltages to generate a plurality of output speeds from the motor. The system also includes a sensor to measure a parameter corresponding to an outdoor ambient temperature and to provide a signal to the controller with the measured parameter. The controller is configured to operate the motor drive to generate a predetermined output speed from the compressor motor in response to the outdoor ambient temperature being less than or equal to 95° F. The predetermined output speed is less than a maximum output speed from the compressor motor. The controller is configured to operate the motor drive to generate the maximum output speed from the compressor motor in response to the outdoor ambient temperature being greater than a predetermined temperature. The predetermined temperature is greater than 95° F.

One advantage of the present application is improved matching of the compressor's output capacity to the HVAC system's load requirements at higher temperatures for improved efficiency.

Other features and advantages of the Application will be apparent from the following more detailed description of the preferred embodiment(s), taken in conjunction with the accompanying drawings which show, by way of example, the principles of the Application. In addition, alternative exemplary embodiments relate to other features and combinations of features as may be generally recited in the claims.

BRIEF DESCRIPTION OF THE FIGURES

FIG. 4 illustrates schematically an exemplary embodiment of a control drive.

Wherever possible, the same reference numbers will be used throughout the drawings to refer to the same or like parts.

DETAILED DESCRIPTION OF THE EXEMPLARY EMBODIMENTS

Figure 1:
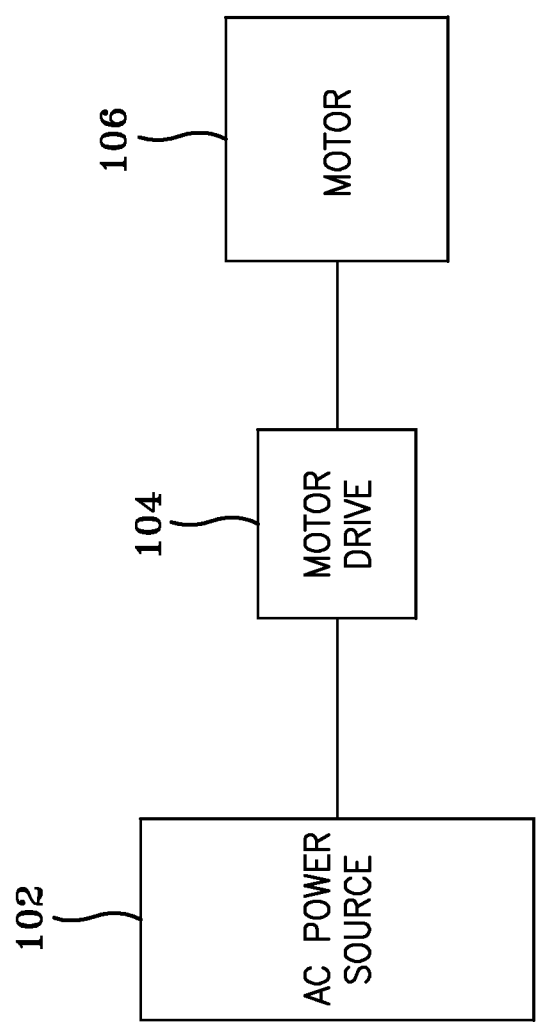
FIG. 1 illustrates schematically an exemplary embodiment of a motor system.

In FIG. 1, an alternating current (AC) power source 102 supplies electrical power to a motor drive 104, which powers a motor 106. The motor 106 can be used to drive a corresponding compressor of a vapor compression system, e.g., a heating, ventilation, air conditioning and refrigeration (HVAC&R) system (see generally, FIGS. 3A and 3B). The AC power source 102 provides single phase or multi-phase (e.g., three phase), fixed voltage, and fixed frequency AC power to the motor drive 104. The motor drive 104 can accommodate virtually any AC power source 102, such as an AC power source 102 that can supply an AC voltage or line voltage of between 100 and 600 volts AC (VAC), for example, 187 VAC, 208 VAC, 230 VAC, 380 VAC, 460 VAC, or 600 VAC, at a line frequency of 50 Hz or 60 Hz.

The motor drive 104 can be a variable speed drive (VSD) or variable frequency drive (VFD) that receives AC power having a particular fixed line voltage and fixed line frequency from the AC power source 102 and provides power to the motor 106 at a desired voltage and desired frequency (including providing a desired voltage greater than the fixed line voltage and/or providing a desired frequency greater than the fixed line frequency), both of which can be varied to satisfy particular requirements. Alternatively, the motor drive 104 can be a "stepped" frequency drive that can provide a predetermined number of discrete output frequencies and voltages, i.e., two or more, to the motor 106.

Figure 2:
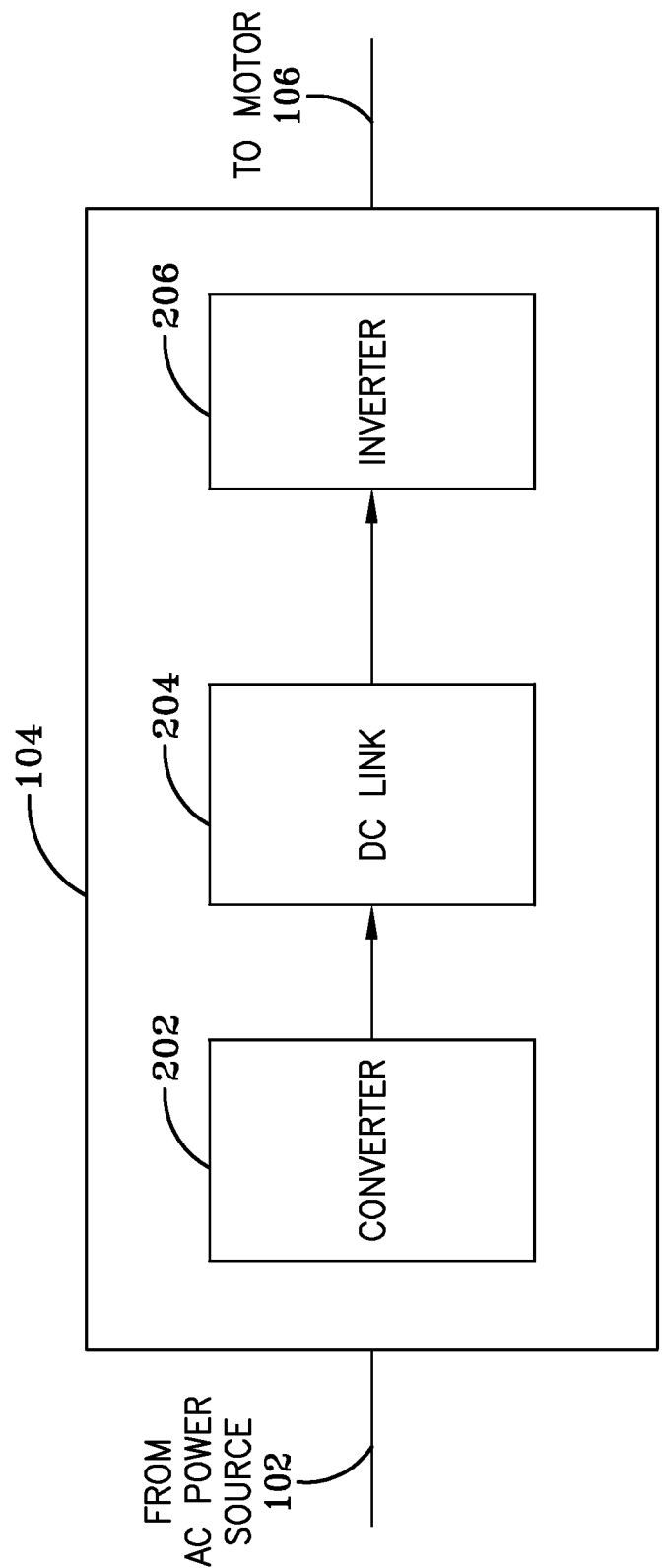
FIG. 2 illustrates schematically an exemplary embodiment of a motor or variable speed drive.

FIG. 2 illustrates one embodiment of the motor drive (VSD) 104. The VSD 104 can have three stages: a converter/rectifier stage 202, a DC link/regulator stage 204 and an output stage having an inverter 206. The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. The inverter 206 converts the DC power from the DC link 204 into variable frequency, variable voltage power for the motor 106. Furthermore, it is to be understood that the converter 202, DC link 204 and inverter 206 of the VSD 104 can incorporate several different components and/or configurations so long as the converter 202, DC link 204 and inverter 206 of the VSD 104 can provide the motor 106 with appropriate output voltages and frequencies.

In an exemplary embodiment, the motor drive (VSD) 104 can be used to slowly increase (ramp-up) the speed and/or torque of the motor 106 during a start-up of the motor 106. The ramping-up of the speed and/or torque during start-up can minimize hydraulic forces in the compressor, if liquid refrigerant is present in the oil sump, thereby eliminating the need to preheat oil in the compressor before start-up with a crankcase oil heater.

In addition, in another embodiment, the motor 106 can operate from a nominal voltage that is less than the fixed voltage provided by the AC power source 102 and output by the motor drive 104. By operating at a voltage that is less than the fixed AC voltage, the motor 106 is able to continue operation during times when the fixed input voltage to the motor drive 104 fluctuates. For example, the motor can be nominally optimized for approximately 187 V (i.e., the lowest expected voltage for this type of equipment) so any low or high voltage excursions from the normal line voltages are absorbed by the drive and a constant voltage is applied to the motor. This "multivoltage input and output voltage regulator" feature permits one drive to operate on virtually any available AC power source. The nominal output voltage value of the drive is frequency and load dependent and can vary based on those needs.

In other embodiments, the output capacity of the compressor may be adjusted without changing the speed of the motor (and the compressor) with a VSD or other motor drive. For example, certain scroll compressors can modulate between 100% capacity and about 66% capacity using a solenoid valve (controlled by a 24V signal) inside the compressor. In a variant of the previous example, the discharge gas may be returned back to the suction input based on the receipt of a control signal. In other examples, reciprocating compressors and rotary compressors having multiple cylinders may be configured to use less than all of the available cylinders depending on the direction of rotation of the shaft to obtain lower output capacities for the compressor. Also, certain multiple cylinder compressors can vary capacity by closing off the suction gas flow to one or more cylinders of the multiple cylinder compressor.

In still another embodiment, compressor capacity may be adjusted through the use of an internal valve controlled by pressure differentials within the compressor. As the outdoor ambient temperature changes, the pressure of the vapor inside the compressor can similarly change. Once a certain pressure (corresponding to an outdoor ambient temperature) is reached in the compressor, a valve inside the compressor can be opened or closed to adjust the output capacity of the compressor.

Figure 3A:
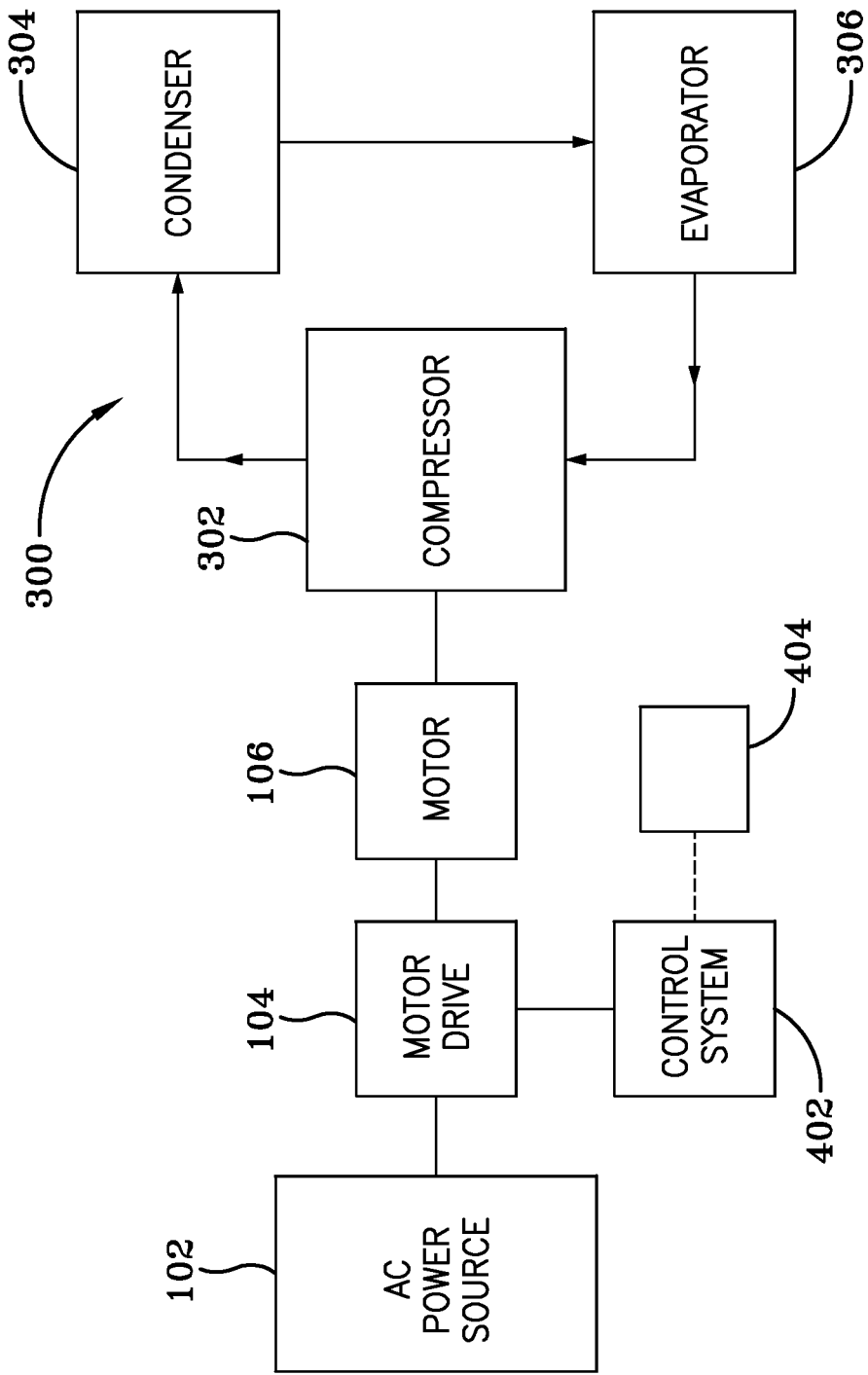
FIGS. 3A and 3B illustrate schematically exemplary embodiments of vapor compression systems.
Figure 3B:
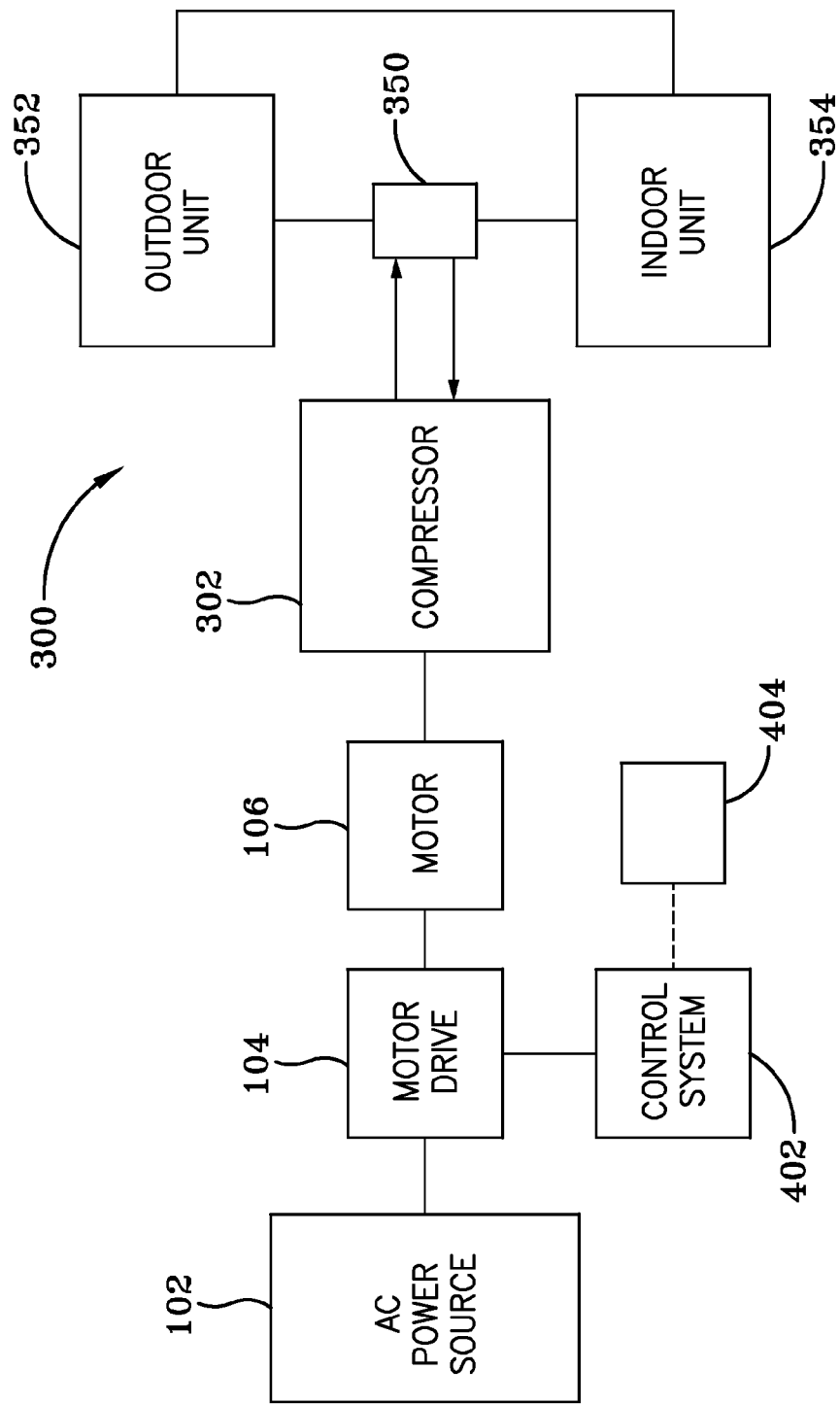

As shown in FIGS. 3A and 3B, a vapor compression system, such as the heating, ventilation, air conditioning and refrigeration (HVAC&R) system 300, includes a compressor 302, a condenser 304, and an evaporator 306 or a compressor 302, a reversing valve 350, an indoor unit 354 and an outdoor unit 352. The system 300 can be operated as an air conditioning only system, where the evaporator 306 can be located indoors, i.e., as indoor unit 354, to provide cooling to the indoor air and the condenser 304 can be located outdoors, i.e., as outdoor unit 352, to discharge heat to the outdoor air. The system can also be operated as a heat pump system with the inclusion of the reversing valve 350 to control and direct the flow of refrigerant from the compressor 302. When the heat pump is operated in an air conditioning mode, the reversing valve 350 is controlled for refrigerant flow as described above for an air conditioning system. However, when the heat pump is operated in a heating mode, the flow of the refrigerant is in the opposite direction from the air conditioning mode and the condenser 304 can be located indoors, i.e., as indoor unit 354, to provide heating of the indoor air and the evaporator 306, i.e., as outdoor unit 352, can be located outdoors to absorb heat from the outdoor air.

Referring back to the operation of the system 300, whether operated as a heat pump or as an air conditioner, the compressor 302 is driven by the motor 106 that is powered by a motor drive or VSD 104. The motor drive 104 receives AC power having a particular fixed line voltage and fixed line frequency from AC power source 102 and provides power to the motor 106. The motor 106 used in the system 300 can be any suitable type of motor that can be powered by a motor drive 104. The motor 106 can be an induction motor, a switched reluctance (SR) motor, an electronically commutated permanent magnet motor (ECM) or any other suitable motor type.

Referring back to FIGS. 3A and 3B, the compressor 302 compresses a refrigerant vapor and delivers the vapor to the condenser 304 through a discharge line (and the reversing valve 350 if operated as a heat pump). The compressor 302 can be a reciprocating compressor, rotary compressor, screw compressor, swing link compressor, scroll compressor, turbine compressor, or any other suitable compressor. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from the condenser 304 flows through an expansion device (not shown) to the evaporator 306.

The liquid refrigerant delivered to the evaporator 306 enters into a heat exchange relationship with a fluid, e.g., air or water, and undergoes a phase change to a refrigerant vapor as a result of the heat exchange relationship with the fluid. The vapor refrigerant in the evaporator 306 exits the evaporator 306 and returns to the compressor 302 by a suction line to complete the cycle (and the reversing valve 350 if operated as a heat pump). It is to be understood that any suitable configuration of the condenser 304 and the evaporator 306 can be used in the system 300, provided that the appropriate phase change of the refrigerant in the condenser 304 and evaporator 306 is obtained.

FIG. 4 illustrates an embodiment of a capacity control system 400 used to provide capacity modulation in the compressor 304. The capacity control system 400 includes the motor drive or VSD 104, as discussed above, to power the motor 106 of the compressor 302. In addition, the capacity control system 400 also includes a control system 402, such as a controller or microprocessor, to control the operation of the motor drive 104. In one embodiment, the controller or microprocessor 402 and the motor drive 104 are integrated on a single circuit board. However, it is to be understood that the controller or microprocessor 402 and the motor drive 104 can be separate from each other.

In addition, a temperature sensor 404 is used to provide a measurement of the outdoor ambient temperature to the controller or microprocessor 402. The temperature sensor 404 can be any suitable device for measuring temperature, e.g, a thermistor, or other refrigerant system sensor, and can be located in any suitable location that can provide an accurate measurement of the outdoor ambient temperature. In one exemplary embodiment, the controller 402 can be configured to control the output of the motor drive 104 in response to a temperature measurement from the temperature sensor 404.

In another embodiment, the controller 402 can control the output of the motor drive 104 in response to other system parameters. For example, the controller 402 can control the motor drive 104 in response to measurements of condenser refrigerant pressure, evaporator refrigerant pressure, liquid line temperature, evaporator refrigerant temperature, condenser refrigerant temperature, suction pressure or temperature, motor current and/or condenser air temperature. It is to be understood that the appropriate sensor is used to measure the desired system parameter. Furthermore, the specific operation of the controller 402 may require modifications to accommodate a particular system parameter in order to provide the desired output capacities from the compressor. In still another embodiment, the controller 402 can control the output of the motor drive 104 in response to the temperature in the conditioned/enclosed space.

The controller or microprocessor 402 can provide the appropriate control signals to the motor drive 104 to control the output of the motor drive 104, i.e., output voltage and output frequency from the motor drive 104. By controlling the output of the motor drive 104, the controller 402 is able to control the output speed of the motor 106 and in turn, the output capacity of the compressor 302. The controller 402 provides control signals to the motor drive 104 that result in an output frequency (and corresponding voltage) being provided to the motor 106 by the motor drive 104. The corresponding voltage to be provided to the motor 106 by the motor drive 104 for a particular output frequency can be either a preset voltage that is selected to provide optimal performance or an adjustable voltage that can be determined by the controller 402 in response to system conditions. The output frequency and corresponding voltage provided to the motor 106 results in a specific operating speed for the motor 106 and specific output capacity for the compressor 302.

In an exemplary embodiment, the controller 402 can control the motor drive 104 to provide at least two discrete output frequencies to the motor 106, while providing the appropriate output voltages to maintain optimal motor performance, in response to the outdoor ambient temperature during operation of the system 300 in an air conditioning or cooling mode as activated by a control signal.

In an exemplary embodiment, the control system 402 can be used to implement a capacity control algorithm at higher outdoor ambient temperatures, i.e., outdoor ambient temperatures greater than 95° F. The control system 402 can control the motor drive 104 to provide a predetermined output frequency and predetermined output voltage to the motor 106 that results in a predetermined output capacity for the compressor that is less than 100% output capacity for the compressor 302. In the present application, 100% output capacity for the compressor 302 is the maximum capacity obtainable from the compressor 302 based on the configuration of the system 300, including the configuration of the AC power source 102, motor drive 104, motor 106, compressor 302, condenser 304 and evaporator 306. The control system 402 can control motor drive 104 to provide the predetermined output frequency and predetermined output voltage to the motor 106 for outdoor ambient temperatures less than or slightly greater than 95° F. Once the outdoor ambient temperature reaches a predetermined temperature greater than 95° F., the control system 402 can control the motor drive 104 to provide an output frequency and output voltage to the motor 106 that results in 100% output capacity for the compressor. The predetermined temperature used to trigger a change in operation of the control system 402 can be selected to be between about 96° F. and about 105° F.

In one exemplary embodiment, system 300 can be configured such that 100% output capacity for the compressor 302 can satisfy the system's cooling load requirements at the 115° F. outdoor ambient temperature condition. The predetermined output capacity for the compressor 302 can be selected to be an output capacity for the compressor 302 that satisfies the cooling load requirement for system 300 at the 95° F. outdoor ambient temperature condition, but does not result in operation of the system 300 with substantial excess capacity. In other words, the predetermined output capacity is an output capacity for the compressor that satisfies the system load requirements at the 95° F. outdoor ambient temperature condition, but does not result in the generation of significant unused capacity from the compressor. Since compressor capacity decreases as the outdoor ambient temperature increases, the compressor is switched over to 100% output capacity operation at a temperature greater than 95° F. in order to continue to satisfy system cooling load requirements up to the 115° F. outdoor ambient temperature condition.

Figure 5:
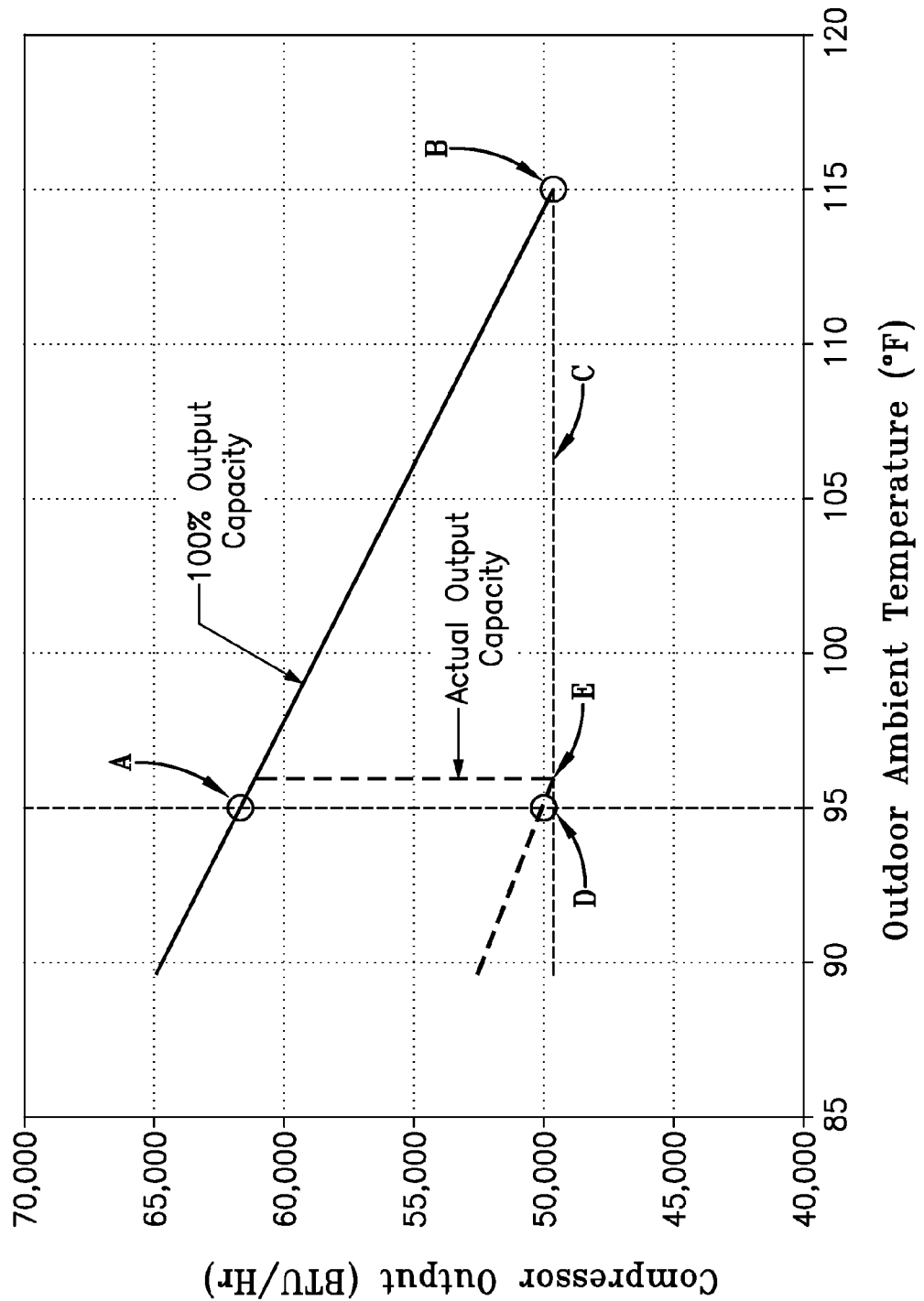
FIG. 5 is a chart showing compressor capacity versus outdoor ambient temperature for an exemplary HVAC&R system.

FIG. 5 is a chart showing compressor capacity versus outdoor ambient temperature for an exemplary HVAC&R system. As shown in FIG. 5, point A corresponds to the 100% output capacity operation point, which is approximately 62,000 BTU/Hr, for the compressor at an outdoor ambient temperature of 95° F. As the outdoor ambient temperature increases to about 115° F., the 100% output capacity operation point for the compressor is reduced to or falls to approximately 49,700 BTU/Hr at point B. Line C shows the maximum cooling load requirement for the HVAC system, which is approximately 49,700 BTU/Hr, and corresponds to the amount of output capacity required from the compressor to satisfy cooling load requirements for the system at worst case conditions. As can be seen in FIG. 5, point B intersects line C and thus the compressor has sufficient output capacity to satisfy the cooling load requirements for the system at the 115° F. outdoor ambient temperature condition. However, operating the compressor at the 100% output capacity point for the 95° F. outdoor ambient temperature condition results in excess capacity being generated because point A is substantially above line C. The generation of excess capacity, i.e., the difference in output capacity between point A and line C, results in inefficient operation of the system and compressor due to excessive compressor cycling and wasted energy.

To reduce the amount of excess capacity generated at the 95° F. outdoor ambient temperature point, the control system lowers the output capacity of the compressor to an output capacity that is at or just above or below line C at the 95° F. outdoor ambient temperature point. FIG. 5, the reduced compressor output capacity point is shown as point D, which is approximately 50,200 BTU/hr. In one exemplary embodiment, the reduced compressor output capacity can be selected to be between about 60% to about 90% of the 100% output capacity operation point for the compressor. In another exemplary embodiment, the reduced compressor output capacity can be about 80% of the 100% output capacity operation point for the compressor.

The control system can adjust the operation of the compressor from reduced compressor output capacity to 100% output capacity when the outdoor ambient temperature reaches a predetermined temperature above 95° F. (see point E in FIG. 5). The adjustment in compressor output capacity is required to ensure that the compressor is providing enough output capacity to satisfy any cooling load requirement of the system, i.e., the output capacity of the compressor stays above line C. In an exemplary embodiment, the control system can adjust the output capacity from the reduced compressor output capacity to 100% output capacity in one step (as shown in FIG. 5) or over a series of steps. The implementation of step changes can be based on the elapsing of a predetermined time period or the reaching of a predetermined temperature. In another embodiment, the control system can gradually or continuously adjust the output capacity from the reduced compressor output capacity to 100% output capacity.

In an exemplary embodiment, the control system can adjust or change the output capacity of the compressor to better match the actual required capacity of the system at the 95° F. outdoor ambient temperature condition and lower the system rated capacity to the minimum required system capacity which supports the 115° F. outdoor ambient temperature condition. The control system can adjust the output capacity of the compressor by adjusting motor speed with the motor drive. Alternatively, the control system can mechanically lower compressor capacity by opening or closing valves which operate to reduce the output capacity of the compressor. In another exemplary embodiment, the compressor can be configured to automatically adjust compressor capacity with mechanical devices, e.g. valves, based on pressure differentials in the compressor or with other suitable techniques.

In another exemplary embodiment, a minimum required system capacity to support high load conditions, e.g., a 115° F. outdoor ambient temperature condition, is determined. Then, the compressor is operated at a reduced capacity that is greater than the minimum required system capacity at the 95° F. outdoor ambient temperature condition. At a temperature above 95° F., the compressor capacity can be transitioned from reduced capacity operation to "full" or non-reduced, i.e., 100%, output capacity operation, to maintain the compressor output capacity above the minimum required system capacity as the outdoor ambient temperature approaches the 115° F. outdoor ambient temperature condition.

It should be understood that the application is not limited to the details or methodology set forth in the following description or shown in the figures. It should also be understood that the phraseology and terminology employed herein is for the purpose of description only and should not be regarded as limiting.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The present application contemplates methods, systems and program products on any non-transitory, machine-readable media for accomplishing its operations. The embodiments of the present application may be implemented using existing computer processors, or by a special purpose computer processor specifically designed to implement one or more embodiments of the present application. Likewise, software implementations could be accomplished with standard programming techniques, with rule based logic or other logic to accomplish the various connection steps, processing steps, comparison steps and decision steps.

What is claimed is:

1. A method of controlling output capacity for a compressor in a heating, ventilation and air conditioning (HVAC) system comprising:
   determining a cooling requirement for the HVAC system at a predetermined outdoor ambient temperature condition, the predetermined outdoor ambient temperature condition being greater than 95° F.;
   measuring an outdoor ambient temperature;
   operating the compressor to generate a predetermined output capacity in response to the outdoor ambient temperature being less than or equal to 95° F., the predetermined output capacity being less than 100% output capacity from the compressor, the predetermined output capacity is greater than the cooling requirement for the HVAC system at the predetermined outdoor ambient temperature condition;
   increasing the output capacity of the compressor to 100% output capacity in response to the outdoor ambient temperature being greater than a predetermined temperature and less than the predetermined outdoor ambient temperature condition, the predetermined temperature being greater than 95° F.; and
   operating the compressor at 100% output capacity in response to the outdoor ambient temperature being greater than the predetermined temperature.

2. The method of claim 1 wherein the predetermined temperature is between about 96° F. and about 105° F.

3. The method of claim 1 wherein increasing the output capacity of the compressor comprises actuating a mechanical device.

4. The method of claim 1 wherein increasing the output capacity of the compressor comprises adjusting an output frequency and voltage from a variable speed drive.

5. The method of claim 1 wherein 100% output capacity from the compressor satisfies the determined cooling load requirements for the HVAC system at the predetermined outdoor ambient temperature condition.

6. The method of claim 1 wherein the predetermined output capacity is 80% of the 100% output capacity from the compressor.

7. The method of claim 1 wherein increasing the output capacity of the compressor comprises increasing the output capacity of the compressor to 100% output capacity in a single step.

8. The method of claim 1 wherein the predetermined outdoor ambient temperature condition is 115° F.

9. The method of claim 8 further comprising maintaining the output capacity of the compressor to be greater than the cooling requirement for the HVAC system at the 115° F. outdoor ambient temperature condition in response to outdoor ambient temperatures less than 115° F.

10. The method of claim 1 wherein the determined cooling load requirement for the HVAC system at the predetermined outdoor ambient temperature condition corresponds to the maximum cooling requirement for the HVAC system.

11. A system comprising:
    a compressor, a condenser and an evaporator connected in a closed refrigerant loop;
    a motor connected to the compressor to power the compressor, the motor being configured to operate at a plurality of output speeds to generate a plurality of output capacities from the compressor;
    a motor drive connected to the motor to power the motor, the motor drive being configured to provide the motor with a plurality of output frequencies and corresponding voltages to generate the plurality of output speeds from the motor;
    a control system to control operation of the motor drive;
    a sensor to measure a parameter corresponding to an outdoor ambient temperature and to provide a signal to the control system with the measured parameter;
    the control system is configured to operate the motor drive to generate a predetermined output capacity from the compressor in response to the outdoor ambient temperature being less than or equal to 95° F., the predetermined output capacity being less than 100% output capacity from the compressor;
    the control system is configured to operate the motor drive to generate 100% output capacity from the compressor in response to the outdoor ambient temperature being greater than a predetermined temperature, the predetermined temperature being greater than 95° F;
    the system has a minimum cooling requirement at a predetermined outdoor ambient temperature condition, the predetermined outdoor ambient temperature condition being greater than the predetermined temperature; and
    the control system is configured to operate the motor drive to maintain the output capacity of the compressor to be greater than the minimum cooling requirement in response to outdoor ambient temperatures less than the predetermined outdoor ambient temperature condition.

12. The system of claim 11 wherein the predetermined temperature is between about 96° F. and about 105° F.

13. The system of claim 11 wherein the motor drive is a variable speed drive.

14. The system of claim 11 wherein 100% output capacity from the compressor at the predetermined outdoor ambient temperature condition satisfies the minimum cooling requirement for the system.

15. The system of claim 11 wherein the predetermined output capacity is 80% of the 100% output capacity from the compressor.

16. The system of claim 11 wherein the predetermined outdoor ambient temperature condition is 115° F.

17. The system of claim 16 wherein the output capacity of the compressor at 115° F. corresponds to the minimum cooling requirement.

18. The system of claim 11 wherein the predetermined output capacity is greater than the minimum cooling requirement.

19. A control system for a compressor motor comprising:
    a motor for a compressor, the compressor having an output capacity based on operation of the motor;
    a motor drive connectable to the compressor motor to power the compressor motor, the motor drive being configured to provide the compressor motor with a plurality of output frequencies and corresponding voltages to generate a plurality of output speeds from the motor;
    a controller to control operation of the motor drive;
    a sensor to measure a parameter corresponding to an outdoor ambient temperature and to provide a signal to the controller with the measured parameter;
    the controller is configured to operate the motor drive to generate a predetermined output speed from the compressor motor in response to the outdoor ambient temperature being less than or equal to 95° F., the predetermined output speed being less than a maximum output speed from the compressor motor;
    the controller is configured to operate the motor drive to generate the maximum output speed from the compressor motor in response to the outdoor ambient temperature being greater than a predetermined temperature, the predetermined temperature being greater than 95° F; and the controller is configured to operate the motor drive to maintain the output speed of the compressor motor such that the output capacity from the compressor satisfies maximum load requirements of a system incorporating the compressor at outdoor ambient temperatures less than a predetermined ambient temperature condition, the predetermined outdoor ambient temperature condition being greater than the predetermined temperature.

20. The system of claim 11 wherein the predetermined temperature is between about 96° F. and about 105° F.

* * * * *